Jan. 28, 1969  V. J. PIZZITOLA  3,424,505
FLUID BEARING
Filed Oct. 10, 1966
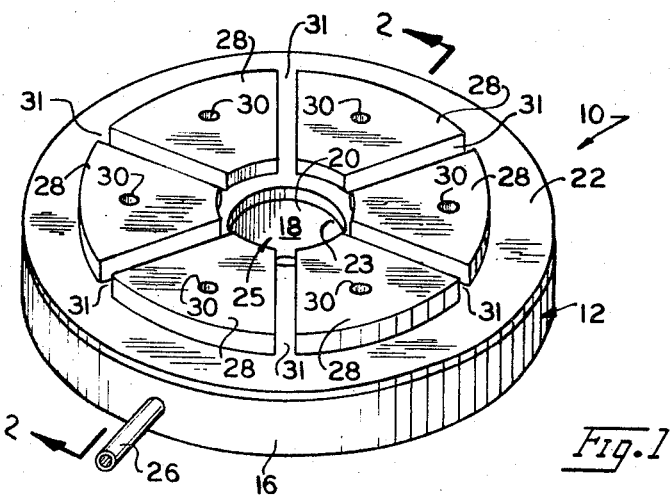
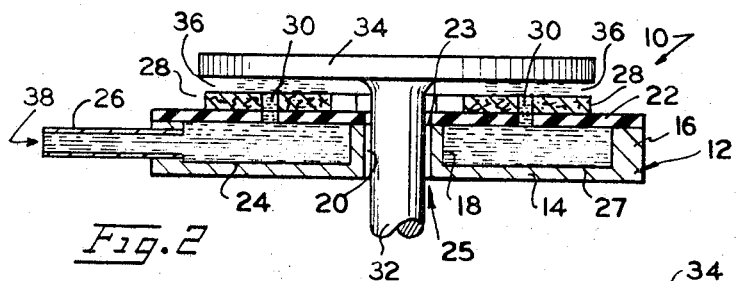
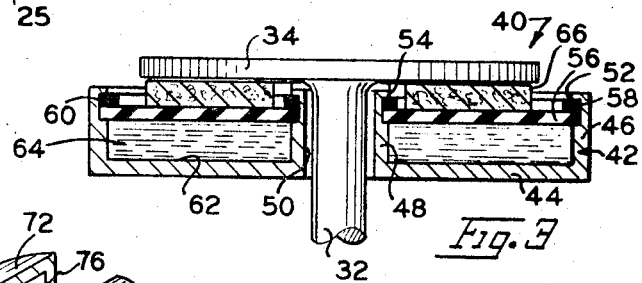
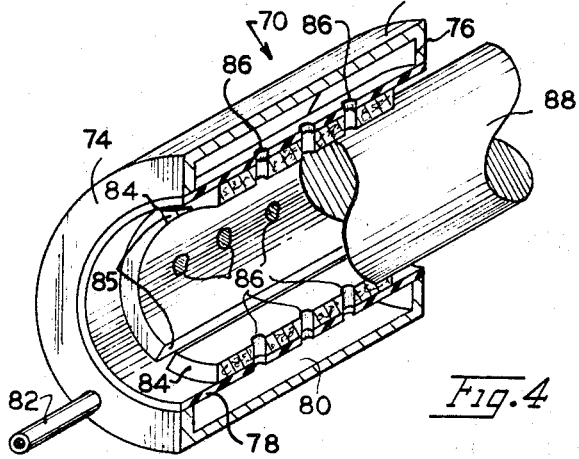
INVENTOR.
VITO J. PIZZITOLA
BY
ATTORNEYS

United States Patent Office 3,424,505
Patented Jan. 28, 1969

3,424,505
FLUID BEARING
Vito J. Pizzitola, Deer Park, N.Y., assignor to Eastern Bearings & Manufacturing Co., Inc., Uniondale, N.Y., a corporation of New York
Filed Oct. 10, 1966, Ser. No. 585,585
U.S. Cl. 308—73        6 Claims
Int. Cl. F16c 17/06, 17/08

ABSTRACT OF THE DISCLOSURE

A bearing in which a housing includes a flexible diaphragm that supports a plurality of bearing elements that define a support surface in the rest condition and in a condition of rotation create a decreased pressure area between such elements and a cooperating bearing surface into which area fluid moves to afford a fluid bearing barrier.

---

This invention relates to improvements in bearings for supporting rotating elements.

In conventional bearings for supporting rotating elements there is substantial frictional contact and engagement between the rotating elements of the bearing structure. Hence, a retarding force is normally generated between the moving elements due to the frictional forces which are produced when one surface moves relative to another surface. This force is in a direction which opposes the motion of the rotating elements and causes undue wear of the element and the bearing thereby shortening their respective lives.

Accordingly, the desideratum of the present invention is to provide a bearing having moving or rotating elements in which the frictional forces between the moving elements are reduced to a minimum value.

Another object and feature of the present invention resides in the novel details of construction that provide a bearing in which the rotating elements are supported on a layer of a fluid such as air thereby to provide a substantially frictionless bearing.

Another object of the present invention is to provide a bearing which has practically an infinite life beiause there substantially is no wear between the moving elements thereof.

In furtherance of the above objects, one embodiment of the bearing of the present invention comprises a housing which includes a flexible member or diaphragm. The housing further includes a fluid-filled chamber which is defined in part by the diaphragm. The diaphragm mounts a plurality of circumferentially spaced shoes or bearing elements each of which provides a support surface for the moving element when the element is at rest. A rotatable member supported by the bearing or forming a part thereof is adapted to be positioned adjacent the bearing surfaces of the bearing shoes.

When the rotatable member is at rest, it is supported on the surfaces of the adjacent bearing elements. However, when the rotatable member is caused to rotate, its movement relative to the adjacent surfaces of the bearing shoes creates a decreased pressure area or zone between it and the adjacent bearing surfaces. Because the fluid in this area or zone is of lower pressure than that of a fluid that surrounds the bearing and the rotating member a relative vacuum is created such that the surrounding fluid tends to move into and fill the vacuum.

The movement of fluid into the lower pressure zone is, by the nature of its movement, under pressure. This phenomenon results in separating slightly the rotating member from the adjacent bearing surfaces. The slight space provided between the two, being constantly filled with a flowing movement of fluid, provides a boundary layer or cushion of fluid between the rotating member and bearing surfaces. This cushion forms a substantially frictionless fluid bearing. Thus, other than for the relatively short periods of actual frictional contact with the bearing surface during starting and stopping of the rotating member, wear on the relatively movable parts is negligible.

Other features and advantages of the present invention will become more apparent from a consideration of the following detailed description when taken in conjunction with the accompanying drawings, in which:

FIG. 1 is a perspective view of a thrust bearing constructed in accordance with the present invention, FIG. 2 is a sectional view thereof taken along the line 2—2 of FIG. 1, FIG. 3 is a vertical sectional view of a modified embodiment of a thrust bearing similar to the thrust bearing shown in FIG. 1, and FIG. 4 is a perspective vertical sectional view of a journal bearing constructed according to the present invention.

The bearing structure of the present invention is designated generally by the numeral 10 in FIGS. 1 and 2 and includes a circular or annular housing indicated generally by the numeral 12. The housing 12 includes a circular bottom wall 14 having a peripheral wall 16 upstanding from the outer edge of the bottom wall, and a wall 18 upstanding from the inner edge of the wall 14 to define a through bore 20. The housing 12 further includes a flexible member or diaphragm 22 fabricated from a flexible and resilient material which is suitably securely connected to the upper edges of the walls 16 and 18, as by bonding or cementing, to provide a top wall for the housing 12. The diaphragm 22 is provided with a central through bore 23 which is coaxial with the bore 20 to provide a composite central through bore designated generally by the numeral 25 in the housing 12. In practice, the diaphragm 22 may be fabricated from vulcanized rubber.

Defined between the bottom wall 14 and the diaphragm 22, and the upstanding walls 16 and 18 is an annular fluid chamber 24. The chamber 24 communicates with a source of fluid through a hollow tube 26 which extends radially from the wall 16. The fluid, which is designated by the numeral 27, may be gaseous or liquid. In practice, the fluid utilized in the bearing 10 has been air. Since the diaphragm 22 overlies and closes the annular chamber 24, it will be obvious that the diaphragm may be flexed either inwardly or outwardly relative to the chamber 24.

The diaphragm 22 mounts a plurality of annularly spaced bearing elements or shoes 28. As shown in FIG. 1, the shoes 28 are segmentally shaped and are spaced radially inward from the outer and the inner edges of the diaphragm 22. The shoes 28 may be bonded individually to the upper surface of the diaphragm 22 in any conventional manner, as by vulcanizing or cementing the two together to enable each of them to move relative to the other. Moreover, the shoes 28 may be fabricated from a metal or an alloy the upper bearing surface of which is polished to provide a smooth surface to reduce friction forces to a minimum during starting and stopping of the rotatable element.

Extending through each of the shoes 28 and the diaphragm 22 and approximately centrally located in each of the shoes 28 is a respective aperture 30 which communicates with the chamber 24. The apertures 30 provide a means through which the fluid 27 in the chamber 24 may exit. Thus, the fluid 27 enters the chamber 24 through the tube 26 and leaves the chamber 24 through the plurality of apertures 30.

Rotatably received through the bore 25 in the housing 12 is a shaft 32. The shaft 32 forms the rotatable element which is supported by the thrust bearing 10. The shaft 32 may be the output shaft of a motor (not shown). However, this illustration is by way of example only and is not to be interpreted as a limitation on the present invention since the thrust bearing 10 may be utilized in conjunction with any rotatable or rotating element which may also form a part of the bearing structure 10. The shaft 32 includes a circular plate 34 (FIG. 2) which overlies the shoes 28. That is, the diameter of the plate 34 is larger than the outer diameter of the shoes 28.

When the shaft 32 is initially at rest, the undersurface of the plate 34 will rest upon the upper bearing surfaces of the shoes 28. Accordingly, the shoes 28 support the weight of the shaft 32 and the plate 34. In operation, as the shaft 32 begins to rotate and the plate 34 likewise rotates with respect to the shoes 28, such relative motion creates a vacuum or a decreased pressure zone 36 between the lower surface of the plate 34 and the upper bearing surfaces of the bearing shoes 28.

Because of the presence of a decreased pressure zone so close to and surrounding the apertures 30, the fluid in the housing, being under a relatively greater pressure, tends to rush out of the apertures and to move into the lower pressure zone. In turn, the fluid exiting under pressure through the apertures 30 exerts a force on the lower surface of the plate 34 that causes the rotating plate 34 and the shaft 32 to move further away from each other as shown in FIG. 2. It is to be noted that the tube 26 may be connected to a source of fluid under pressure or the tube 26 may simply vent to the atmosphere. In any case, the pressure differential will be such as to cause fluid to enter the chamber 24 through the tube 26, as indicated by the arrowhead 38, and to leave the chamber 24 through the apertures 30 under pressure.

As a result of the air or fluid 27 which exits through the apertures 30 due to the pressure differential, there is provided a layer or cushion of fluid in the decreased pressure zone 36 between the lower surface of the plate 34 and the upper surface of the shoes 28 to bearingly support the same in separation. It will now be obvious that when the shaft 32 and, consequently, the plate 34 is rotating, there will be no contact between the shaft including the plate 34 and the bearing 10. In other words, a cushion of air or fluid 27 spaces the plate 34 from the upper bearing surfaces of the shoes 28 so that there is no contact between the plate 34 and the bearing surfaces. In light of the fact that there is no contact between the rotating plate 34 and the bearing elements, there substantially are no frictional forces applied to the plate and shaft 32 by the bearing elements to retard the motion of the shaft.

Additionally, since one relatively moving surface does not engage the other as in conventional bearings, there is substantially no wear on the parts of the bearing structure 10. That is, the only time wear occurs is when the plate 34 engages the shoes 28 while the shaft 32 is rotating, and this occurs only when the shaft 32 begins to move or is about to stop. However, since this is an exceedingly short interval of time, for all intents and purposes, there is substantially no wear.

It has been noted that the bearing elements or shoes 28 are annularly spaced from each other about the flexible diaphragm 22. These spaces are directed radially and are identified in the drawing by the numeral 31. During the rotation of the member 34, the spaces 31 function as fluid passages along which fluid surrounding the bearing moves into the confines of the space between the rotating member and the adjacent bearing surfaces to quickly and constantly fill the same with bearing fluid.

The individual and separate securement of the bearing elements 28 to the flexible diaphragm or member 22 enables the diaphragm to move and yield separately along portions of its annular extent. This is accomplished by utilizing the fluid in the chamber 27 which flows and moves within the chamber when subjected to displacing forces applied to it by the diaphragm. In use, the fluid contained within the chamber 27 supports the diaphragm 22 to receive, transmit and distribute the forces applied to any one of the bearing shoes 28 evenly to the diaphragm so that all the other bearing shoes 28 are supported by the fluid in the chamber and the diaphragm and the force or load is equally shared amongst them.

Thus, the chamber fluid serves to yield in the event a force applied to any one or more shoes is greater than that applied to others. It then transmits the unequal force to the diaphragm by distributing force equally to the support of the diaphragm. This, in turn, equalizes the forces on the bearings 28.

In practice, it is well known that bearings often are required to function with eccentric or off-center shafts and other rotating members. It will be recognized by those who are skilled in the art that the present invention functions unusually well under such conditions. This is because the fluid in the chamber 27 will flow to enable the diaphragm to tilt to the eccentricity of the workpiece and to distribute the eccentric forces equally to the bearing shoes 28.

FIG. 3 illustrates a modified embodiment of a thrust bearing constructed according to the present invention. Similar numbers in FIGS. 1–3 indicate identical elements. The bearing of FIG. 3 is designated generally by the numeral 40 and includes a housing which is indicated generally by the numeral 42. Similar to the housing 12, the housing 42 includes a circular bottom wall 44 having a central through bore, an upstanding peripheral wall 46 connected to the outer edge of the circular wall 44, and a wall 48 upstanding from the inner edge of the wall 44. The wall 48 defines a through bore 50 which extends through the center of the bearing 40.

Provided on the inner surface of the peripheral wall 46 and the inner surface of the inner wall 48 are opposed respective annular grooves 52 and 54 which are spaced from the top edges of the respective walls. Received in the grooves 52 and 54 is an annular diaphragm 56. The diaphragm 56 is maintained in place by an outer lock ring 58 which seats in the groove 52 and an inner lock ring 60 which seats in the groove 54.

The diaphragm 56 defines one wall of an annular chamber 62 in the bearing 40; the other walls of the chamber 62 are defined by the walls 44, 46 and 48. Since the annular diaphragm 56 is held only at the edges by means of the lock rings 58 and 60, the diaphragm may be flexed either inwardly or outwardly relative to the chamber 62. A fluid 64 is sealed within the chamber 62. The fluid 64 may be either liquid or gaseous.

The diaphragm 56 mounts a plurality of annularly spaced shoes or bearing element 66 similar in construction and shape to the elements 28 of the bearing 10 shown in FIGS. 1 and 2. However, the bearing shoes 66 are not provided with apertures 30 because the fluid 64 in the chamber 62 does not exit therefrom as it does in the embodiment of FIGS. 1 and 2. The shaft 32 is rotatably received in the bore 50 and is freely movable therein. The shaft 32 includes and is formed with the plate 34 which overlies the bearing elements or shoes 66 as shown in FIG. 3 and which may also form a working part of the bearing structure 40 in the same manner as in the embodiment 10.

The operation of the bearing 40 is similar to the operation of the bearing 10. More specifically, as the shaft 32 begins to rotate, the relative movement between the plate 34 and the stationary bearing shoes 66 causes the creation of a decreased pressure zone or vacuum to exist between the shoes 66 and the plate 34. Atmospheric air about the bearing rushes in between the radial spaces or passages defined by the bearings 66 to fill the vacuum between the lower surface of the plate 34 and the upper surface of the bearing shoes 66. The movement of atmospheric air rushing to fill the vacuum causes the plate 34 and bearings 66 to move relatively away from each other slightly in the same manner as in the embodiment of FIGS. 1 and 2, to provide a cushion bearing of air therebetween. Hence, the bearing 40 likewise provides a means for supporting a rotating shaft with a minimum amount of friction between the moving elements.

As in the prior embodiment 10, if any gradual or sudden unequal forces or pressures are applied to any one of the bearing shoes 66, as by an impact or the eccentric rotation of the shaft 32 and the rotating member 34, these will be transmitted to the fluid 64 trapped in chamber 62. These unequal forces will be distributed immediately to the whole of the diaphragm 56 which applies the same to all the bearing elements 66 equally. In consequence, the forces applied to the bearings 66 always are in equilibrium.

A journal bearing constructed according to the present invention is illustrated in FIG. 4 and is designated generally by the numeral 70. The journal bearing 70 includes an outer cylindrical sleeve 72 having radially inwardly directed front and rear flanges respectively designated by the numerals 74 and 76. A flexible tube 78 is connected to the inner edges of the flanges 74 and 76 and defines the inner wall of a chamber 80 with respect to the outer sleeve 72. The chamber 80 communicates with the atmosphere through a hollow tube 82 which is received in the flange 74. Alternatively, the tube 82 may connect the chamber 80 with a source of fluid under pressure. Since the tube 78 is flexible, it may flex radially inwardly or radially outwardly with respect to the axis of the journal bearing 70.

Mounted within and on the exposed inner surface of the tube 78 and spaced from the ends thereof are three circumferentially spaced bearing elements or shoes 84. The spaces between the bearing shoes 84 define passages 85 that perform the same function as the fluid passages 31 of the embodiment 10. A respective row of radially extending apertures 86 extend through the flexible tube 78 and each shoe 84 and communicate with the chamber 80. In practice, the axes of the bearing shoes 84 are spaced from each other by 120°. However, this exact spacing and the number of bearing shoes is for illustration only and is not to be interpreted as a limitation of the present invention.

A shaft 88 is rotatably received in the bearing and may function as a working part thereof. The shaft 88 is slightly smaller in diameter than the bore defined by the inner walls of the bearing shoes 84 so that the shaft 88 may be in spaced relation to the bearing surfaces of the shoes 84.

In operation, as the shaft 88 begins to rotate, a decreased pressure zone or vacuum is produced between the rotating shaft 88 and the shoes 84. The fluid in the chamber 80, may be air under atmospheric pressure or it may be connected with a source of pressurized fluid through the tube 82. The fluid is caused to exit through the apertures 86. This is similar to the operation of the bearing 10 wherein the pressure differential applied to the chamber 80 is such that the fluid pressure will be greater at the hollow tube 82 than it will be at the apertures 86 in the area of the created lower pressure thereby causing the air to flow through the chamber 80 and out of the apertures 86. The fluid or air flowing out of the apertures 86 apply a force to the shaft 88 in a direction such as to space the shaft 88 from the bearing shoes 84 so that the shaft 88 essentially rotates on a cushion or layer of fluid or air. This fluid bearing is enhanced by the movement of fluid through the passages defined by the bearing shoes 84. Hence, after a relatively short period of rotation, the moving element 88 is encompassed in an air bearing that prevents direct frictional contact with the bearing shoes 84 thereby to provide a substantially frictionless bearing.

Moreover, similar to the thrust bearings illustrated in FIGS. 1–3, the bearing 70 automatically compensates for eccentricities between the axes of the bearing and the shaft 88 and the application of sudden pressures or forces applied to either the rotating member 88 or the surfaces of the bearing elements or shoes 84. Thus, all distributing or unequal forces applied to any one of the bearing shoes 84 will be transmitted by the diaphragm to the entrapped fluid and then immediately distributed back to the whole of the diaphragm. These forces are thereby distributed equally among the bearing elements 84 such that no one bearing element ever carries a load greater than that supported by the others.

While preferred embodiments of the present invention have been shown and described herein, it will be obvious that numerous omissions, changes and additions may be made in such embodiments without departing from the spirit and scope of the present invention.

What is claimed is:
1. In a bearing,
a plurality of relatively movable bearing elements,
a flexible member supporting said elements for movement relative to each other in response to forces applied thereto,
a fluid housing including said flexible member,
and a fluid in said housing supporting said flexible member for distributing equally to others of said plurality of bearing elements forces applied to each of said bearing elements,
said fluid housing being cylindrical in shape,
said flexible member being tubular in shape and defining a closure wall of said fluid housing,
and said bearing elements being circumferentially spaced about said flexible member,
each of said bearing elements having a bearing surface,
said housing being connected with a source of fluid,
and at least an aperture in said flexible member and in each of said bearing elements for the communication of fluid from said fluid source and housing to said bearing surface.

2. In a bearing,
a plurality of relatively movable bearing elements,
a flexible member supporting said elements for movement relative to each other in response to forces applied thereto,
a fluid housing including said flexible member,
and a fluid in said housing supporting said flexible member for distributing equally to others of said plurality of bearing elements forces applied to each of said bearing elements,
said housing being annular in shape and including a bottom wall having an upstanding outer annular wall and an upstanding inner annular wall,
said flexible member being annular in shape and extending between said inner and outer walls to define a closure wall of said fluid housing,
and said bearing elements being relatively spaced annularly about said flexible member,
each of said bearing elements having a bearing surface,
said housing being connected with a source of fluid,
and at least an aperture in said flexible member and in each of said bearing elements to communicate fluid from said source and housing to said bearing surface.

3. A bearing for supporting a rotating member including a housing having a flexible diaphragm,
a chamber in said housing defined in part by said diaphragm,
and a plurality of bearing means on said diaphragm adapted to be spaced from a portion of the rotating member so that a vacuum is created therebetween upon the rotation of the rotating member,
and a fluid in said chamber to transmit pressures equally throughout said chamber to balance unequal pressures applied to said diaphragm through said bearing means,
whereby a fluid entering the vacuum provides a fluid bearing between said bearing means and the rotating member to bearingly support the rotating member spaced from said bearing means, an aperture extending through each of said plurality of bearing means and communicating with said chamber, means for connecting said chamber with a source of fluid, whereby the fluid in said chamber is communicated through said apertures to fill the vacuum between the rotating member and said bearing means to provide said fluid bearing for supporting the rotating member.

4. A bearing for supporting a rotating member including a housing having a flexible diaphragm, a chamber in said housing defined in part by said diaphragm, and a plurality of bearing means on said diaphragm adapted to be spaced from a portion of the rotating member so that a vacuum is created therebetween upon the rotation of the rotating member, and a fluid in said chamber to transmit pressures equally throughout said chamber to balance unequal pressures applied to said diaphragm through said bearing means, whereby a fluid entering the vacuum provides a fluid bearing between said bearing means and the rotating member to bearingly support the rotating member spaced from said bearing means, in which said housing is cylindrical, said diaphragm being tubular in shape to provide the inner wall of said cylindrical housing, apertures extending through each of said bearing means and said diaphragm and communicating with said chamber, means for connecting said chamber with a source of fluid, whereby the fluid in said chamber communicates through said apertures to fill the vacuum created between the rotating member and said bearing means to provide a cushion of fluid between each of said bearing means and the rotating member.

5. In a bearing including the combination of a rotatable member supported thereby, a flexible member, a plurality of relatively movable bearing elements, said flexible member connecting said bearing elements with each other and for relative movement, a fluid housing, fluid in said housing displaceable by said flexible member in response to forces acting on said bearing elements to transmit and distribute such forces equally to said flexible member and said bearing elements in response to unequal forces transmitted thereto by said flexible member from any one of said bearing elements, said bearing elements being relatively spaced from each other whereby when said rotating member rotates a low pressure area is created between the same and said bearing elements and the spaces between said bearing elements enable the passage into said low pressure area of fluid surrounding said rotating member and bearing elements to form a fluid bearing between said rotating member and bearing elements, said fluid housing being connected with a source of fluid, and at least an aperture in said flexible member and in each of said bearing elements to communicate fluid from said source to said bearing surface.

6. In a bearing including the combination of a rotatable member supported thereby as in claim 5, each of said bearing elements having a bearing surface.

References Cited

UNITED STATES PATENTS

| | | | |
|---|---|---|---|
| 2,906,571 | 9/1959 | Casacci | 308—160 |
| 1,425,979 | 8/1922 | Kingsbury | 308—160 |
| 3,131,004 | 4/1964 | Sternlicht | 308—73 |
| 3,298,751 | 1/1967 | Elwell | 308—160 |

MARTIN P. SCHWADRON, *Primary Examiner.*

FRANK SUSKO, *Assistant Examiner.*

U.S. Cl. X.R.

308—160